US008940454B2

(12) United States Patent
Chuang (10) Patent No.: US 8,940,454 B2
(45) Date of Patent: Jan. 27, 2015

(54) CARBON-BASED FUEL CELL (75) Inventor: Steven S. C. Chuang, Hudson, OH (US)

(73) Assignee: The University of Akron, Akron, OH (US)

( * ) Notice: Subject to any disclaimer, the term of this patent is extended or adjusted under 35 U.S.C. 154(b) by 1589 days.

(21) Appl. No.: 10/576,385

(22) PCT Filed: Nov. 15, 2004

(86) PCT No.: PCT/US2005/007591
§ 371 (c)(1),
(2), (4) Date: Feb. 20, 2007

(87) PCT Pub. No.: WO2006/028502
PCT Pub. Date: Mar. 16, 2006

(65) Prior Publication Data
US 2007/0212584 A1    Sep. 13, 2007

Related U.S. Application Data

(60) Provisional application No. 60/520,155, filed on Nov. 14, 2003, provisional application No. 60/558,856, filed on Apr. 2, 2004.

(51) Int. Cl.
*H01M 8/10* (2006.01)
*H01M 8/12* (2006.01)
(Continued)

(52) U.S. Cl.
CPC .............. *H01M 8/22* (2013.01); *H01M 4/8647* (2013.01); *H01M 4/9016* (2013.01);
(Continued)

(58) Field of Classification Search
CPC .......................... H01M 8/0637; H01M 8/1233
See application file for complete search history.

(56) References Cited

U.S. PATENT DOCUMENTS

| 4,259,414 A |   | 3/1981  | Williams |         |
|-------------|---|---------|----------|---------|
| 5,376,469 A | * | 12/1994 | Gur et al. ...................... | 429/426 |

(Continued)

FOREIGN PATENT DOCUMENTS

| WO | WO 99/45607 | 9/1999 |
| WO | WO 01/39309 | 5/2001 |

(Continued)

OTHER PUBLICATIONS

Rodriguez, Jose A., Interaction of Sulfur with Well-Defined Metal, American Chemical Society, Accounts of Chemical Research,1999.
(Continued)

*Primary Examiner* — Barbara Gilliam
*Assistant Examiner* — Stephan Essex
(74) *Attorney, Agent, or Firm* — Renner Kenner Greive Bobak Taylor & Weber (57) ABSTRACT

A direct-electrochemical-oxidation fuel cell and method for generating electrical energy from a solid-state organic fuel. The fuel cell includes a cathode provided with an electrochemical-reduction catalyst that promotes formation of oxygen ions from an oxygen-containing source at the cathode, an anode provided with an electrochemical-oxidation catalyst that promotes direct electrochemical oxidation of the solid-state organic fuel in the presence of the oxygen ions to produce electrical energy, and a solid-oxide electrolyte disposed to transmit the oxygen ions from the cathode to the anode. The electrochemical oxidation catalyst can optionally include a sulfur resistant material.

35 Claims, 8 Drawing Sheets

(51) Int. Cl.
*H01M 8/22* (2006.01)
*H01M 4/86* (2006.01)
*H01M 4/90* (2006.01)
*H01M 4/92* (2006.01)
*H01M 8/04* (2006.01)
*H01M 8/06* (2006.01)

(52) U.S. Cl.
CPC ........... *H01M 4/9025* (2013.01); *H01M 4/905* (2013.01); *H01M 4/9066* (2013.01); *H01M 4/92* (2013.01); *H01M 4/923* (2013.01); *H01M 8/04201* (2013.01); *H01M 8/0637* (2013.01); *H01M 8/0643* (2013.01); *H01M 8/1206* (2013.01); *H01M 8/1233* (2013.01); *H01M 8/1246* (2013.01); *H01M 8/1253* (2013.01); *H01M 8/126* (2013.01); *H01M 8/1266* (2013.01); *Y02E 60/521* (2013.01); *Y02E 60/525* (2013.01)
USPC ........... 429/495; 429/496; 429/442; 429/524; 429/528

(56) References Cited

U.S. PATENT DOCUMENTS

| | | | |
|---|---|---|---|
| 5,733,435 A | 3/1998 | Prasad et al. | |
| 5,955,039 A | 9/1999 | Dowdy | |
| 6,017,646 A | 1/2000 | Prasad et al. | |
| 6,183,896 B1 | 2/2001 | Horita et al. | |
| 6,680,137 B2 * | 1/2004 | Paisley | 429/426 |
| 7,332,237 B2 * | 2/2008 | Coors | 429/425 |
| 2002/0098401 A1 * | 7/2002 | Barnett | 429/30 |
| 2003/0035989 A1 | 2/2003 | Gorte et al. | |
| 2003/0143440 A1 * | 7/2003 | Tao et al. | 429/13 |
| 2003/0215689 A1 | 11/2003 | Keegan | |
| 2004/0126298 A1 * | 7/2004 | Stark et al. | 423/263 |
| 2006/0057295 A1 * | 3/2006 | Visco et al. | 427/372.2 |
| 2007/0010396 A1 * | 1/2007 | Giaquinta et al. | 502/345 |

FOREIGN PATENT DOCUMENTS

| | | |
|---|---|---|
| WO | WO 01/80335 | 10/2001 |
| WO | WO 03/096469 | 11/2003 |
| WO | WO 03/098729 | 11/2003 |

OTHER PUBLICATIONS

Nasri, N. Shawal, A Comparative Study of Sulfur Poisoning, American Chemical Society, Energy & Fuels, 1998.

Wu, Y.P., Effects of Doped Sulfur on Electrochemical Performance, Elsevier Science, Journal of Power Sources, 2002.

* cited by examiner

CARBON-BASED FUEL CELL

RELATED APPLICATIONS

This application claims the benefit of U.S. Provisional Application No. 60/520,155, filed Nov. 14, 2003; and of U.S. Provisional Application No. 60/558,856, filed Apr. 2, 2004.

FIELD OF THE INVENTION

The invention relates generally to the generation of electrical energy from a solid-state fuel, and more particularly to a solid-oxide fuel cell for generating electrical energy from a solid-state organic fuel according to a direct electrochemical oxidation of the solid-state organic fuel.

BACKGROUND OF THE INVENTION

Conventional solid-oxide fuel cells utilize an electrolyte located between an anode and cathode facilitating the transfer of ions therebetween. Traditionally, solid-state fossil fuels, such as coal, had to be gasified and reformed prior to being introduced to a solid-oxide fuel cell to generate electric energy. Despite the additional processing steps required, the use of such solid-state fossil fuels to generate electricity remained an attractive option due in part to the high energy density of such fuels. The separate gasification and reformation steps required a substantial influx of thermal energy, and heat recovery was low, thereby resulting in an inefficient process.

Attempts to improve process efficiency for generating electricity with a solid-oxide fuel cell included the incorporation of the reformation step into the fuel-cell apparatus, which required to fuel cell to operate at temperatures above 1473 K. By incorporating the reformation step within the fuel cell, at least a portion of the heat required to reform the fossil fuel could be recovered and utilized during the electrical-energy generation process. However, such fuel cells experienced a buildup of fly ash, a byproduct produced from the combustion of solid fossil fuels, on the surface of a catalyst provided to an electrode, and accordingly, a retardation of the fuel cell's performance. It is believed that the buildup of fly ash was due to the elevated operating temperatures of the fuel cell, greater than about 1473 K, which is greater than the fly ash fusibility temperature that must be exceeded before the fly ash can deposit on the catalyst's surface. Additionally, these conventional, high-temperature fuel cells also exhibited excess sulfur precipitation on the catalyst surface and high NO emissions.

Alternate designs have been proposed to convert solid-state fossil fuels directly to $CO_2$ and electric energy while minimizing the production of CO. Such designs divided the fuel cell into a plurality of different temperature zones, and dedicated a heating element for controlling the temperature in each respective temperature zone. Both fuel-cell electrodes, one on each opposing side of a solid electrolyte, were formed from either the same noble-metal or the same mixed conducting oxide material to facilitate the complete oxidation of carbon according to the reaction:

$$C + O_2 \rightarrow CO_2$$

Such designs were cumbersome due to the requirement of different temperature zones to provide a sufficiently-high temperature to minimize the impedance to ion-conduction by the solid electrolyte, while at the same time providing a sufficiently-low temperature to favor the complete oxidation of carbon to $CO_2$.

Other conventional fuel-cell designs have attempted to generate electrical energy from fossil fuels without providing a plurality of different temperature zones. As previously mentioned, solid-state fossil fuels such as coal can be introduced into a fuel cell having gasification features for gasifying the solid-state fuel before the carbon is oxidized to generate CO, $H_2$ and electric energy. Electrodes made from different materials are installed adjacent to the solid-oxide electrolyte to generate ions and facilitate the partial oxidation of the fossil fuel according to the reaction:

$$C_m H_n + mO^{-2} \rightarrow mCO + \frac{n}{2}H_2 + 2me^-$$

Such fuel cells prevent the favoring of complete oxidation of the fossil fuel, even after gasification, to produce $CO_2$ by requiring an excess of carbon at the oxidation electrode.

Accordingly, there is a need in the art for a fuel cell that can produce electric as a product of a reaction that directly and completely oxidizes a solid-state fossil fuel to produce CO2. The fuel cell should minimize costs and inefficiencies associated with a gasification step prior to being consumed according to the direct oxidation reaction. Further, the fuel cell should address the competing temperature requirements of the electrolyte impedance and the direct oxidation reaction to favor production of $CO_2$ over CO.

SUMMARY OF THE INVENTION

The present invention achieves these and other objectives by providing a direct-electrochemical-oxidation fuel cell for generating electrical energy from a solid-state organic fuel. The fuel cell comprises a cathode provided with an electrochemical-reduction catalyst that promotes formation of oxygen ions from an oxygen-containing source at the cathode, an anode provided with an electrochemical-oxidation catalyst that promotes direct electrochemical oxidation of the solid-state organic fuel in the presence of the oxygen ions to produce electrical energy, and a solid-oxide electrolyte disposed to transmit the oxygen ions from the cathode to the anode. Direct electrochemical oxidation at the anode occurs according to the reaction:

$$C + 2O^{2-} \rightarrow CO_2 + 4e^-$$

According to another aspect, the present invention provides a direct-electrochemical-electrochemical oxidation fuel cell for generating electrical energy from a solid-state organic fuel. The fuel cell comprises a cathode (cathode) provided with an electrochemical-reduction catalyst that promotes the formation of ions from an ion source at the cathode, an anode provided with a catalyst that includes a sulfur-resistant material and promotes electrochemical oxidation of the solid-state organic fuel in the presence of the ions formed at the cathode to produce electrical energy, and a solid-oxide electrolyte disposed to transmit the ions from the cathode to the anode.

According to yet another aspect, the present invention provides a method of generating electric power from a solid-state organic fuel. The method comprises the steps of forming oxygen ions from an oxygen-containing source at a cathode, transmitting the oxygen ions formed at the cathode to an anode with a solid-oxide electrolyte, and catalyzing a reaction of the oxygen ions with the solid-state organic fuel to directly oxidize the solid-state organic fuel at the anode to produce a product comprising $CO_2$ and electrical energy.

According to yet another aspect, the present invention provides a method of generating electric energy from a solid-state organic fuel. The method comprises the steps of establishing an ionic-communication channel between a cathode and an anode with a solid-oxide electrolyte; providing an electrochemical-oxidation catalyst that includes a sulfur-resistant material to the anode, wherein the electrochemical-oxidation catalyst promotes direct electrochemical oxidation of the solid-state organic fuel at the anode to produce a product comprising $CO_2$ and electrical energy; providing an electrochemical-reduction catalyst to the cathode, wherein the electrochemical-reduction catalyst promotes the production of oxygen ions from an oxygen-containing source; and forming a conductive channel to conduct the electrical energy away from the cathode.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTIONS OF PREFERRED AND ALTERNATE EMBODIMENTS

Certain terminology is used herein for convenience only and is not to be taken as a limitation on the present invention. Further, in the drawings, certain features may be shown in somewhat schematic form.

Figure 1:
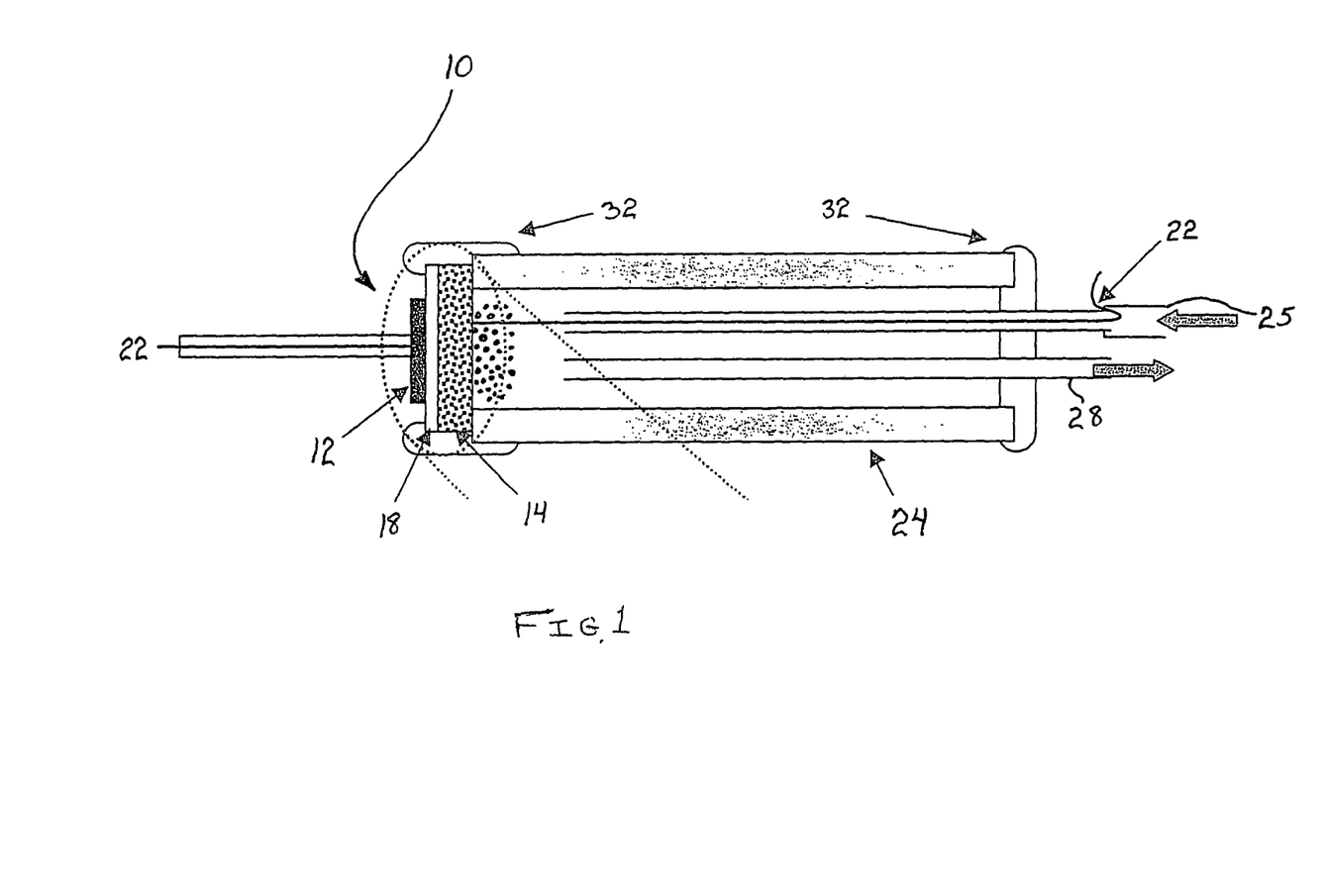
FIG. 1 is a cutaway view of a direct-electrochemical oxidation, carbon based fuel cell in accordance with an embodiment of the present invention.

FIG. 1 is a schematic illustration of a direct electrochemical-oxidation, solid-oxide carbon-based fuel cell 10 according to the present invention for generating electric energy from a solid-state organic fuel without requiring preliminary gasifying and reforming steps. As shown in FIG. 1, the fuel cell 10 includes a cathode 12 provided with an electrochemical-reduction catalyst that promotes formation of oxygen ions from an oxygen-containing source at the cathode 12, an anode 14 (anode) provided with an electrochemical oxidation catalyst that promotes direct electrochemical oxidation of the solid-state organic fuel in the presence of the oxygen ions to produce electrical energy, and a solid-oxide electrolyte 18 disposed to transmit the oxygen ions from the cathode 12 to the anode 14.

Electrochemical oxidation is defined as the oxidation resulting in the transmission of one or more free electrons through an external electric circuit. Conventional oxidation, in contrast, is merely an increase in the oxidation number of the material being oxidized, regardless of the transmission of a free electron.

The solid-state organic fuel can be any carbon-series fuel or any solid material having at least one carbon atom, including fossil fuels such as coal, graphite, charcoal, biomass, polymers such as polyethylene, and other hydrocarbons that are solids at atmospheric pressure and room temperature. Examples of biomass include peat, rice hulls, corn husks, and the like. Although the organic fuel is in the solid state, the fuel can be ground, chopped, or otherwise broken down into small particulate solids to form a fine-powder organic fuel. Breaking the solid-state organic fuel down to fine particles makes the solid-state organic fuel more readily oxidizable in the presence of the oxygen ions on the anode surface. Alternate embodiments of the present invention operate with solid-fuel particle sizes small enough to resemble a fluidized medium. Such embodiments can also entrain the fine particles of solid-state organic fuel in a non-reactive, or inert gas to facilitate the transport of the fuel particles to the anode 14.

The cathode 12 includes an electrochemical-reduction catalyst that promotes formation of oxygen ions from an oxygen-containing source according to the electrochemical-reduction reaction:

$$O_2 + 4e^- \rightarrow 2O^{2-}$$

The oxygen-containing source can be any fluid, such as air, that includes oxygen that can be reduced to $O^{2-}$ in the presence of the cathode catalyst.

Ionic electrically-conductive materials conduct electric current due to the flow of ions, while electronic electrically-conductive materials conduct electric current due to the flow of electrons. a mixed ionic-and-electronic, electrically-conductive material can conduct electric current due to the flow of either ions or electrons, or both.

The cathode 12 is made from a mixed ionic-and-electronic electrically-conductive material, and comprises an electrochemical-reduction catalyst, interchangeably referred to herein as the cathode catalyst, that catalyzes the electrochemical-reduction reaction that takes place at the cathode 12. The cathode 12 according to embodiments of the invention can be a mixed ionic-and-electronic conducting oxide which is a composite of ionic-conducting electrolyte and cathode catalyst. Cathode catalysts can be Lanthanum Strontium Manganese Oxide, having the symbol $La_{0.95}Sr_{0.05}MnO_3$, ("LSMO"), Lanthanum Strontium Ferrite, having the symbol $La_{0.8}Sr_{0.2}FeO_3$, ("LSF"), Lanthanum Strontium Cobalt Ferrite, having the symbol $La_{0.6}Sr_{0.4}Fe_{0.8}Co_{0.2}O_3$, ("LSCF"), and Samaria Strontium Cobalt Oxide, having the symbol $Sm_{0.5}Sr_{0.5}CoO_3$, ("SSC"), for example. Other perovskites suitable to be provided to the cathode catalyst include $YBa_2Cu_3O_y$, wherein y is an integer having values within a range of 7-9; $La_{0.99}MnO_3$; $LaMnO_3$; $La_xSr_yMn_3$ and $La_xCa_yMnO_3$, wherein x is a number having values within a range of 0.6-0.95, and y is a number having values within a range of 0.1-0.4; and any other material having a general formula of $A_xB_yCO_3$, wherein A is selected from the group consisting of La, Gd, Sm, Nd, Pr, Tb and Sr, B is selected from the group consisting of Sr, Ce, and Co, x is a number having values within a range of 0.6-0.95, and y is a number having values within a range of 0.1-0.4. Materials other than mixed conducting oxides such as Ag are also suitable for forming the cathode catalyst of the present invention.

Similar to the cathode 12, the anode 14 is made from a mixed ionic-and-electronic, electrically-conductive material which is a composite of ionic conducting electrolyte and anode catalyst. However, instead of being an electrochemical-reduction catalyst, the anode 14 comprises an electrochemical-oxidation catalyst the promotes direct electrochemical oxidation of the solid-state organic fuel in the presence of the oxygen ions generated at the cathode 12 to produce electrical energy. The electrochemical-oxidation catalyst, also interchangeably referred to herein as the anode catalyst, optionally includes a sulfur-resistant substance that prevents the stable formation of a metal sulfide, thus minimizing the effects of sulfur poisoning on the anode catalyst. The anode catalyst can be a noble metal, group VIII metal/metal oxide, such as Pt, Cu, Ag, Au, Pd, Ni and it can be other metals, however the non-noble metals also include a sulfur-resistant substance such as Re, Mn, Mo, Ag, Cu and Au, oxides of the aforementioned metals as well as oxides of Ce, Cr, Fe, and Pb, combinations thereof, multiple oxides, and combinations including one or more of the aforementioned metals, such as Cu oxide-Pt, and Re—NiO/YSZ, (where YSZ represents Yttrium-Stabalized Zirconia). Embodiments of the anode 14 include compositions that are substantially devoid of vanadium carbide. Vanadium carbide is a heavy metal that is considered to be an environmental pollutant, and thus, it is desirable to eliminate its use in fuel cells. Nonlimiting examples of other suitable anode catalysts include perovskites such as $Sr_{0.6}La_{0.4}TiO_3$, for example. The anode catalysts of the present invention are highly-active oxidizing catalysts that promote the direct and substantially-complete electrochemical oxidation of the solid-state organic fuel at the anode 14 within the operating temperature of the fuel cell 10, without requiring gasification of the solid-state organic fuel before performing the electrochemical oxidation thereof. Maintaining the operating temperature of the fuel cell 10 of the present invention at any temperature within a range of about 460° C. to about 1000° C., or within a range of about 600° C. to about 1000° C., or within a range of about 700° C. to about 900° C., as discussed in detail below, allows direct electrochemical oxidation of the solid-state organic fuel proceeds according to the reaction:

$C + 2O^{2-} \rightarrow CO_2 + 4e^-$

Without being bound or limited by theory, it is believed that the moderate operating temperature of the fuel cell 10 of the present invention is below the fly ash fusibility temperature, which is the temperature above which fly ash will accumulate and adhere to the surface of the anode catalyst. Thus, the fly ash fusibility temperature, which is about 1080° C., (i.e., the initial deformation temperature of Lignite fly ash, the lowest among fly ashes) establishes an upper limit to the operating temperature of the fuel cell 10. Further, it is believed that the moderate operating-temperature range of the present invention minimizes $NO_x$ emissions which tend to be produced at temperatures above the maximum operating temperature of the fuel cell 10, wherein x is an integer having values of 1, 2 and 3. Most of the nitrogen utilized in the production of $NO_x$ is introduced into the fuel cell 10 within the solid-state organic fuel, and thus, $NO_x$ emissions can be further reduced by minimizing the nitrogen concentration within the solid-state organic fuel before introducing that fuel to the fuel cell 10.

In addition to the materials discussed above, both the cathode and the anode each further comprise material that forms the solid-oxide electrolyte 18 for facilitating transportation of the oxygen ions from the cathode to the anode.

A solid-oxide electrolyte 18 is disposed to transport the oxygen ions from the cathode 12 to the anode 14. The solid-oxide electrolyte 18 is the medium which provides the oxygen anion $O^{2-}$ ion-transport mechanism between the cathode 12 and anode 14. Current flow via a solid-oxide electrolyte 18 is due to the movement of ions instead of the movement of electrons as in conventional current flow. As shown in FIG. 1, the solid-oxide electrolyte 18 is located between the cathode 12 and anode 14, which are coupled to opposite surfaces of the solid-oxide electrolyte 18. Suitable solid-oxide electrolytes 18 can be formed from doped oxides of Bi, Zr, Hf, Th, and Ce with either alkaline earth oxides such as CaO or MgO, or rare-earth oxides such as $Sc_2O_3$, $Y_2O_3$, $Yb_2O_3$, and the like. For example, embodiments of the present invention include a solid-oxide electrolyte 18 comprising at least one of $Bi_2O_2$, $(Bi_2O_7)_{0.75}(Y_2O_3)_{0.25}$, $BaTh_{0.9}Gd_{0.1}O_3$, $La_{0.8}Sr_{0.2}Ga_{0.8}Mg_{0.2}O_3$, $(Ce_2)_{0.8}(GdO_{0.5})_{0.2}$, $(ZrO_2)_{0.9}(Sc_2O_3)_{0.1}$, $(ZrO_2)_{0.9}(Y_2O_3)_{0.1}$, $(ZrO_2)_{0.87}(CaO)_{0.13}$, $(La_2O_3)_{0.95}(SrO)_{0.05}$, and the like.

Application of the cathode and anode 12, 14 along with their respective catalysts to the electrolyte 18 can be accomplished by forming the cathode and anode 12, 14 from a paste that comprises the respective catalyst. Each paste is then applied as a film onto suitable surfaces of the solid-oxide electrolyte 18 to facilitate the transfer of oxygen ions from the cathode 12 to the anode 14. Any conventional coating technique can be employed to apply the electrode pastes to the solid-oxide electrolyte 18 surfaces. The thickness of each of the cathode and anode 12, 14 applied to the solid-oxide electrolyte 18 must be balanced along with the thickness of the solid-oxide electrolyte 18 to ensure that forces exerted on each material from the expansion experienced by each within the operating temperature range of the fuel cell 10 does not cause fractures in adjacent materials. Obtaining the suitable thickness of each material can be accomplished by sound engineering judgment by one of ordinary skill in the art. The term "thickness" as used above, refers to the dimensions of each material in a direction perpendicular to a primary planar surface that can form an interface between the cathode and anode 12, 14 and the solid-oxide electrolyte 18.

Conventional electrical conductors in the form of wires 22 extend from each of the cathode and anode 12, 14 to conduct electric energy generated by the fuel cell, thereby forming an electric circuit. Examples of suitable electric-conducting materials include Pt for temperatures less than about 1000° C., Cu for temperatures less than about 600° C., Ni for temperatures less than about 700° C., Ag for temperatures less than about 800° C., stainless steel for temperatures less than about 750° C., any alloys, and electronic conducting oxides.

The assembly comprising the cathode and anode 12, 14 affixed to the solid-oxide electrolyte 18 is operatively coupled to an alumina tube 24 that acts as a housing for the solid-state organic fuel. An inlet port 25 and an outlet port 28 are formed in a seal 32 that encloses a terminus of the alumina tube 24. The fuel cell 10 is heated by a heating element (not shown) that Creates a generally uniform temperature adjacent to the electrodes 12, 14 and solid-oxide electrolyte 18, without forming distinct and thermally isolated temperature zones. Examples of suitable heating elements include an internal resistive heater, and an environmental heater such as a furnace that can accommodate the fuel cell 10 in an elevated-temperature environment.

In operation, air can be introduced as the oxygen source to the cathode 12, thereby causing the ambient oxygen in the air to be ionized and creating oxygen anions, $O^{2-}$. The oxygen anions are transported through the solid-oxide electrolyte 18 to the anode 14, where they react with carbon from the solid-state organic fuel on the surface of the electrochemical oxidation catalyst, releasing electrons to the external circuit according to the direct electrochemical oxidation reaction:

$$C + 2O^{2-} \rightarrow CO_2 + 4e^-$$

Figure 2:
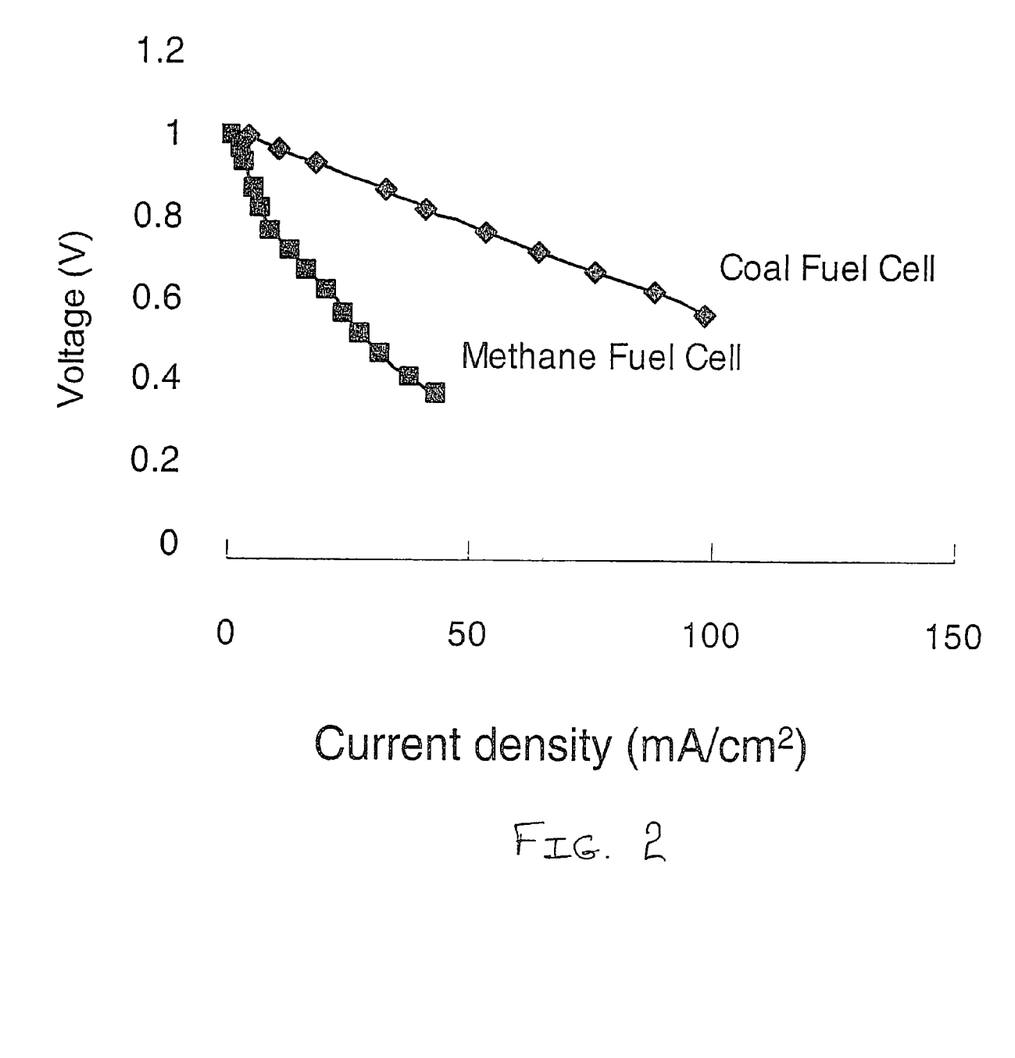
FIG. 2 is a plot of experimentally-determined values for voltage versus current density for a fuel cell operating with methane as the fuel and a fuel cell operating with coal as the fuel.

FIG. 2 offers a comparison of voltage v. current density curve of the fuel cell 10 of the present invention operating at a temperature of 950° C. and using Ohio No. 5 coal (having the composition shown in Table 1) versus that of a fuel cell using methane as a fuel and copper as an anode catalyst under comparable operating conditions. FIG. 2 illustrates that the fuel cell 10 utilizing solid-state organic fuel produced a higher current density than that produced by the fuel cell using methane for a given voltage. Again, without being bound by theory, this unexpected result is believed to be due at least in part to the near absence of dilution of coal (the solid-state organic fuel) at the electrochemical-oxidation catalyst surface by the coal's combustion product, namely, $CO_2$. For the methane fuel cell, $CO_2$ produced during the generation of electric energy dilutes the methane fuel gas at the anode surface. Additionally, it can be observed that the fuel-cell efficiency, giving by:

$$E = \frac{\Delta G°}{\Delta H°}$$

wherein:
E=the fuel cell efficiency
$\Delta G°$: changes in Gibbs free energy due to reaction
$\Delta H°$: Heat of reaction
is higher for the fuel cell 10 of the present invention fueled with the solid-state organic fuel than that for the methane fuel cell. Again, without being bound by theory, this result is believed to be due at least in part to the direct electrochemical oxidation of the solid-state fuel, which produces a gaseous product. The theoretical efficiency of such a reaction is over 100%, which is obviously not practical. However, the high efficiency of the fuel cell 10 of the present invention can be attributed in part to the dramatic increase in entropy experienced by the conversion of a solid carbon-containing fuel to gaseous $CO_2$ in the fuel cell 10.

TABLE 1

| PROXIMATE ANALYSIS | | ULTIMATE ANALYSIS | |
|---|---|---|---|
| % Moisture | 4.15 | % Carbon | 83.99 |
| Dry % ash | 4.80 | % Hydrogen | 5.50 |
| Dry % volatile matter | 37.98 | % Nitrogen | 1.88 |
| Dry % fixed carbon | 57.22 | % Oxygen | 8.63 |
| SULFUR FORMS | | | |
| % Pyritic | 0.70% Organic 1.21 | Calorific Value (BTU/lb) | 14258 |
| % Sulfate | 0.01% Total 1.92 | Equilibrium Moisture (%) | 7.98 |

In addition to the electric energy, the fuel cell 10 produces a product comprising a gaseous exhaust stream while generating electric energy. The exhaust stream comprises primarily $CO_2$, and according to embodiments of the present invention, the concentration of $CO_2$ of at least 50 mol %. Owing in part to the purity of the $CO_2$ in the exhaust stream, direct $CO_2$ sequestration can be performed on the exhaust stream to recover the $CO_2$ product. Similarly, the $NO_x$ concentrations within the exhaust stream are minimized within the operating temperature range of the fuel cell 10. Since the operating temperature of the fuel cell 10 is generally less than the temperature required to produce $NO_x$, and because of the minimal nitrogen concentration in the solid-state organic fuel, $NO_x$ concentrations in the gaseous product produced by the fuel cell 10 are generally less than about 1 mol %.

The production of CO in the gaseous product of the fuel cell is also minimized and is generally less than 5 mol % of the gaseous product. Reduction of the $CO_2$ in the gaseous product according to the reaction:

$$CO_2 + C \rightarrow 2CO$$

is minimized because of the active electrochemical-oxidation nature of the anode catalyst. CO within the gaseous product will be further oxidized almost immediately upon its formation due to the active-electrochemical oxidation properties of the anode catalyst, resulting in a gaseous product comprising no more than 10 mol % CO.

Until the conception of the present invention, it was commonly accepted that generating electrical energy directly from a solid-state organic fuel without first gasifying and optionally reforming the solid-state organic fuel was not possible. Solid-state organic fuels, particularly coal, were considered to be unacceptable fuels because of the perceived fouling and sulfur-poisoning effects the coal and its resulting fly ash would have on the anode catalyst. Leading texts on the subject have recently explained that all attempts to drive fuel cells directly using primary fuels, such as coal and oil, have not been successful due to fouling of the catalyst surface. A. Hamnett and P. Christensen, "Electrochemical and Photo-electrochemical Energy Conversion," ed. N. Hall, Cambridge, 2000, which is incorporated by reference herein in its entirety. The alternative was to gasify the coal or other solid-state fuel to phase suitable for consumption by a fuel cell. Unexpectedly, the sulfur-resistant materials, included in the anode catalyst were discovered to be unable to form a stable sulfide within the operating temperature range of the fuel cell 10, thereby minimizing the effect of sulfur poisoning on the anode catalyst. Thus, considering an anode catalyst comprising Ag or Cu as the sulfur-resistant material, for example, would minimize the formation of the metal sulfide according to the following respective reactions:

$$2Ag_2S + 3O_2 + C \rightarrow 4Ag + 2SO_2 + CO_2$$

$$2Cu_2S + 3O_2 + C \rightarrow 4Cu + 2SO_2 + CO_2$$

Comparable reactions occur with any of the sulfur-resistant materials, which are described above and defined as those materials that do not form stable sulfides within the operating temperature range of the fuel cell 10. The reaction temperature required for these two reactions to take place is about 460° C., thereby defining the minimum operating temperature of carbon-based fuel cell 10.

As mentioned above, adherence of fly ash to the anode catalyst surface, commonly referred to as fouling of the anode catalyst, is minimized because the operating temperature of the fuel cell 10 is below the fly ash fusibility temperature.

The present invention will now be described in detail with reference to the following examples, which do not serve to limit the present invention as claimed herein.

Example 1

Figure 3:
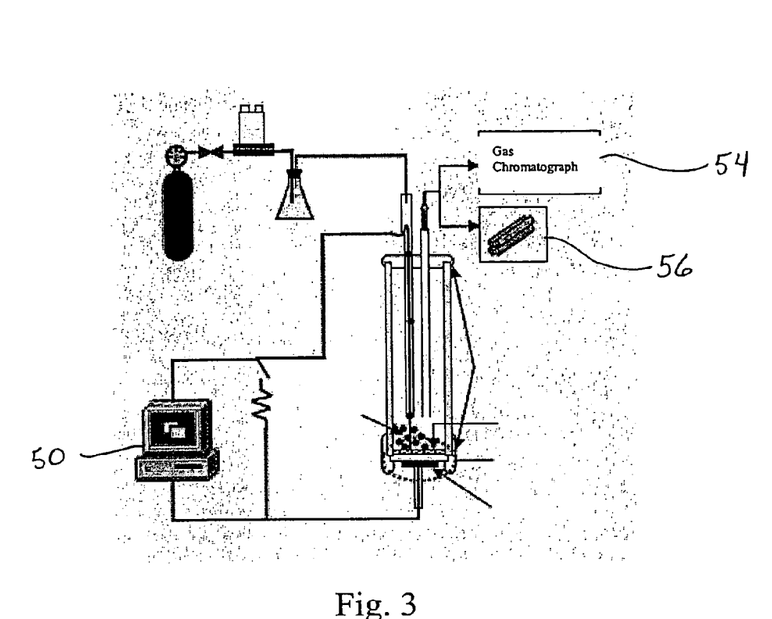
FIG. 3 illustrates a system for experimentally testing operation of a fuel cell in accordance with the present invention.

An experimental assembly including the fuel cell 10 of the present invention is shown in FIG. 3. The fuel cell 10 consists of a dense YSZ disc (from Tosoh Corp.) which is coated with thin layers of anode and cathode catalyst materials that form the electrodes 12, 14. Detailed steps involved in catalyst preparation and fuel cell 10 construction are explained for EXAMPLE 2.

Both current and voltage output data from the fuel cell 10 were acquired by a PC 50 with an interface and Labview™ software. The gaseous exhaust product was analyzed by a SRI 8610C gas chromatograph 54 and a Pfeiffer QMS 200 mass spectrometer 56. The analysis of gaseous products, such as CO and $CO_2$, allows determination of the fuel conversion efficiency and byproduct formation.

Referring once again to FIG. 2, the performance (I-V curves) of the fuel cell 10 with the use of pure $CH_4$ and Ohio No. 5 coal (Table 1) as fuels is shown. Using the coal as the solid-state organic fuel, the coal was loaded in the tubular housing 24 through the inlet port 25 and gradually heated to 950° C. Using the $CH_4$ as the fuel, pure $CH_4$ was fed into the housing 24 at 30 $cm^3$/min. As can be seen in FIG. 2, the use of coal with the fuel cell 10 produced a higher current density than that produced by using $CH_4$ for the fuel. Unexpectedly, the current-voltage (I-V) curve for coal is higher than that for $CH_4$. Comparison of $CH_4$ I-V curve in FIG. 2 with those in the literature shows that the current density for $CH_4$ is about 35% of the best reported data for the direct methane-oxidation fuel cell. See Park, J. M. Vohs, R. L. Gorte, Nature 404 (2000) 265; Ishihara, T. Yamada, T. Akbay, Y. Takita, Chem. Eng. Sci. 54 (1999) 1535; Horita, N. Sakai, T. Kawada, H. Yokokawa, M. Dokiya, J. Electrochem. Soc. 143 (1996) 1161; and S. A. Barnett in Handbook of Fuel Cells, eds: W Vielstich, A. Lamm, and H. A. Gasteiger, Wiley, 2003, all of which are collectively referred to herein as the literature and incorporated in their entirety herein by reference. It is believed that this is due at least in part to the use of a thicker YSZ solid electrolyte (i.e, 1 mm in thickness) in the fuel cell using coal as the fuel relative to the 50 μm thick electrolyte in the literature. The fuel cell 10 produced about a 75% higher current density than that reported for a fuel cell using $CH_4$ as the fuel.

Analysis of the gaseous exhaust stream showed that the major product produced from the fuel cell 10 using coal was primarily $CO_2$ with less than a 5% concentration of CO. CO concentration can be further decreased by decreasing the flow rate of Ar which was used to bring out the gaseous product for the analysis. $SO_2$ was not observed due to both the effect of dilution by purge gas and low sulfur content of coal.

Fly ash produced from coal did not adhere to the anode catalyst surface. This observation is indeed remarkable, considering that fly-ash deposition and slagging are major concerns in the design of coal-fired boilers. Examination of the physical properties of the fly ash and its formation history revealed that the reason for fly ash not sticking on the anode catalyst surface is due at least in part to the operating temperature of the fuel cell 10, which was lower than the fly-ash fusibility temperature. STEAM in generation and use, A Handbook of Babcock & Wilcox, 40th Edition, (1992), which is incorporated in its entirety herein by reference. Analysis of fly ash produced by the Galbraith laboratory showed that the sulfur content of the fly ash was less than 0.1%. Repeating this experiment produced substantially the same level of electric energy as that in the first run.

The performance of a Pt electrochemical-oxidation catalyst was also studied. Comparison of the Cu electrochemical oxidation catalyst described above with the Pt anode catalyst shows that the use of Cu as the electrochemical oxidation catalyst resulted in a higher power density level than that of Pt.

Figure 4:
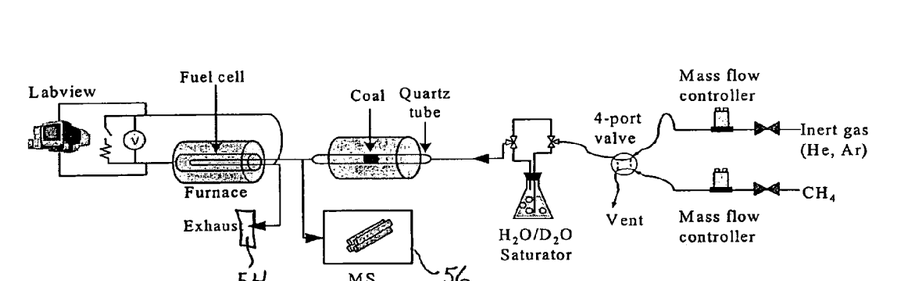
FIG. 4 illustrates an experimental system used to evaluate the contribution of coal gas to the production of electric energy.

Exposure of coal to the high temperature environment could result in pyrolysis of coal, producing coal gas. One issue to be addressed is the extent of contribution of coal gas generated from coal pyrolysis in electric power generation. FIG. 4 illustrates an experimental set up used to evaluate the contribution of coal gas, wherein the experimental setup includes a coal pyrolysis reactor and the fuel cell 10. The composition of coal gas produced was determined by mass spectrometry. FIG. 4 shows the evolution of the gaseous products from coal pyrolysis during temperature programmed heating of coal under 30 $cm^3$/min Helium flow.

Figure 5:
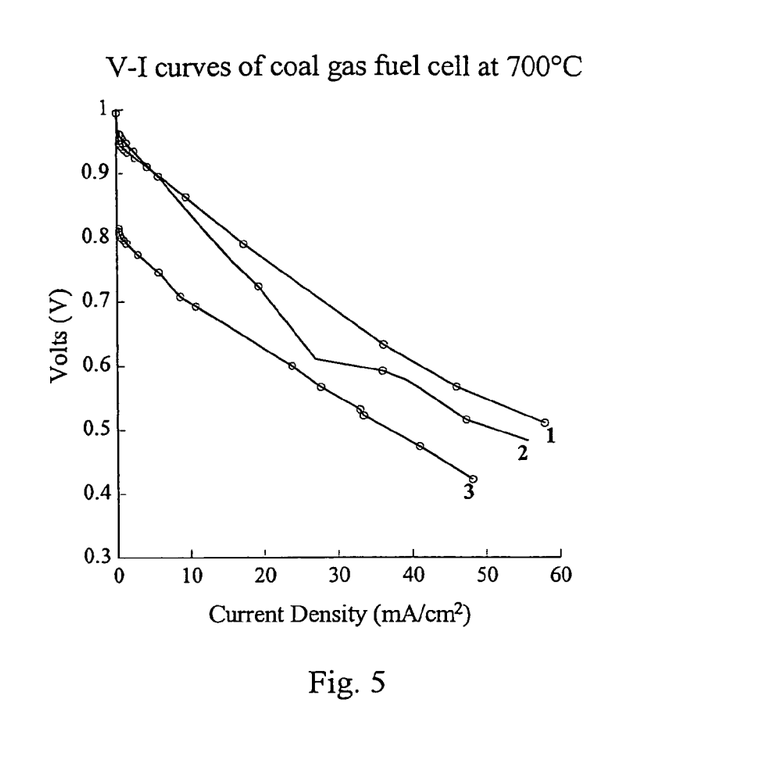
FIG. 5 is a plot of experimentally-determined values for voltage versus current density for a coal-gas fuel cell operating at three different temperatures.

Significant amount of $CH_4$ and CO were produced from coal at 500° C. Further increasing the temperature served to increased $H_2$ formation. The reactor temperature was held at 700° C., 750° C., and 800° C. to measure the performance of the fuel cell 10 using coal gas as the fuel. Results of I-V measurement at 700° C. are shown in FIG. 5. The I-V curve 1, 2, and 3 in FIG. 5 correspond to the line 1, 2, and 3 in FIG. 6, which identifies the composition at which the respective I-V curves in FIG. 5 were measured. Following 30 min of time-on-stream, $CO_2$ was added to the coal gas stream. Addition of $CO_2$ provides the anode catalyst with an environment simulated to the high conversion condition where a large amount of $CO_2$ was present.

Figure 6:
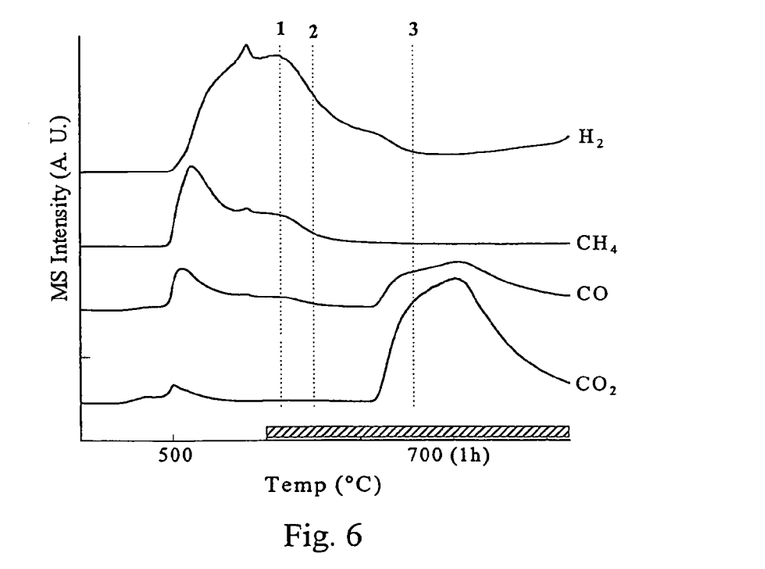
FIG. 6 shows the intensity of components found in an exhaust stream output by a fuel cell in accordance with the present invention as measured by a mass spectrometer.

Close examination of FIGS. 5 and 6, as well as the similar results obtained at 750° C. and 800° C., shows that the current density produced is directly proportional to the $H_2$ concentration. The results confirm that $H_2$ is an effective fuel in producing high current densities among gaseous fuels, which is a well-known fact.

Example 2

Experimental Design

YSZ disks of 1 mm thickness were purchased from Tosoh Inc. as the solid-oxide electrolyte 18. Material to form the anode 14 and electrochemical oxidation catalyst combination was prepared by impregnation of YSZ fibers (provided by Zircar) and YSZ powder (provided by Tosoh) in a 7:3 ratio with $Ni(NO_3)_2$ and $NH_4ReO_4$. The nominal weight percentage of the Ni and Re on the anode material is 5 wt % (wt % represents a weight percentage) and 2 wt %, respectively. The anode/electrochemical oxidation catalyst material was pasted on a surface of the YSZ disc (1000 microns) using glycerine and calcined at 1000° C. for 4 hours. This procedure was repeated two times for making a thin layer to form the anode 14.

The first-electrode material was prepared by mixing Lanthanum Strontium Manganese Oxide (LSM-20,NexTech Materials) and YSZ powder in 1:1 ratio. The first-electrode material was pasted on the YSZ disc to form the cathode 12 using glycerine and calcined at 950° C. for 4 hours.

Solid Oxide fuel Cell Assembly

Figure 7:
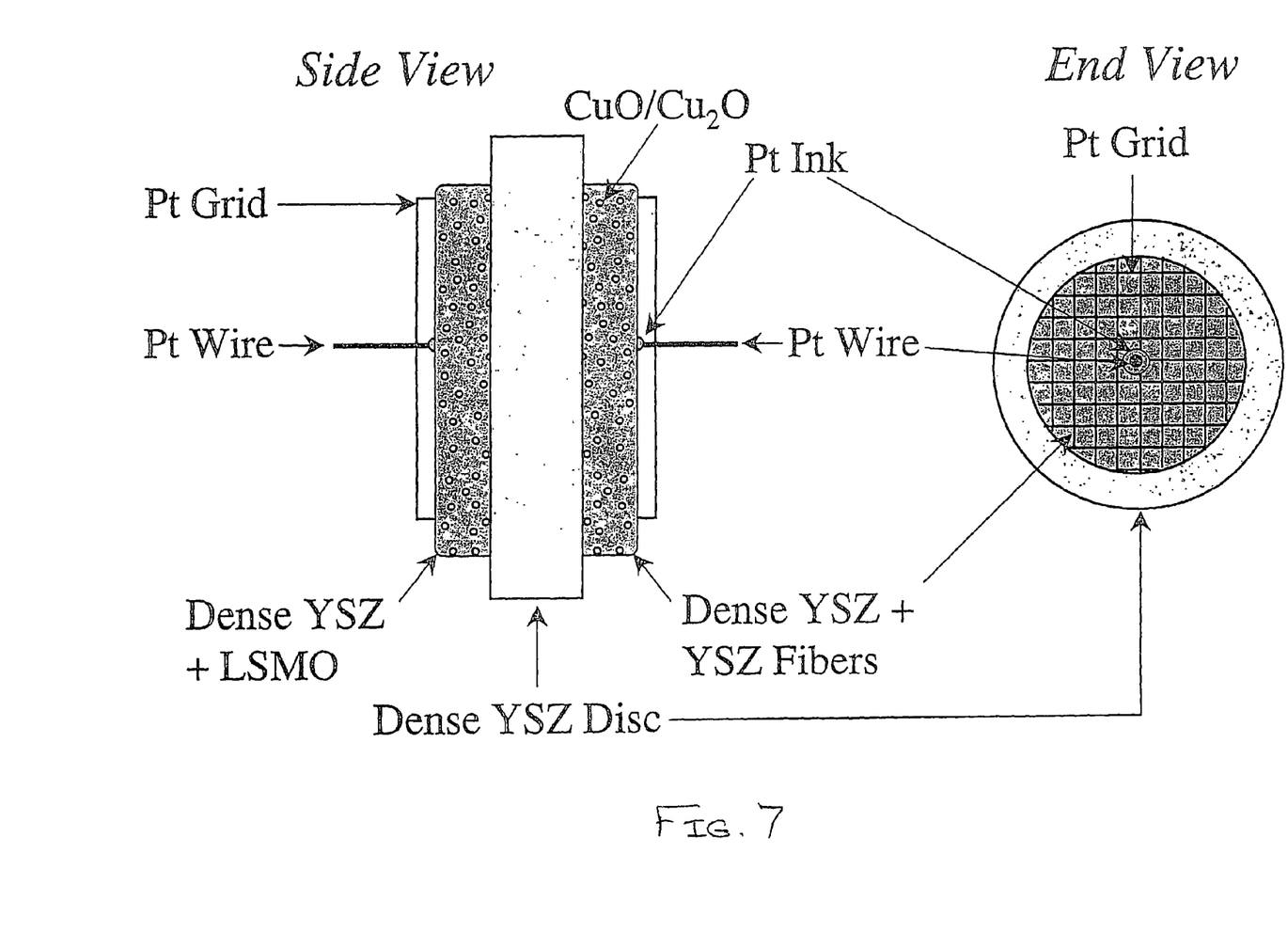
FIG. 7 is a schematic, side view of a fuel cell provided with a Pt grid and Pt ink.

The cathode and anode 12, 14 were each connected to a Pt grid 58 (99.9%, provided by Alfa-Aesar) with the help of Pt ink 62 (provided by Engelhard Corp) and the grids 58 were connected to Pt wires (99.9%) 22 for carrying current as shown schematically in FIG. 7. The Pt grid 58 was held in place with Pt ink 62 and small amount of ceramic paste (provided by Aremco). The Pt ink 62 was cured at 950° C. for 2 hours while the ceramic paste was cured at 85° C. for 2 hours and then at 235° C. for 2 hours. The current and voltage were measured by Labview™ software. The fuel cell 10 was attached to an alumina tube 24 with a ceramic paste. The cathode 12, or cathode was open to atmosphere and the anode 14, or anode was inside the alumina tube 24. The fuel cell 10 was loaded with 3 grams of petroleum coke which was provided by First Energy. The petroleum coke contains carbon and hydrogen with a very small amount ash, as shown in the composition of the petroleum coke tabulated in Table 2. Gaseous fuel including $H_2$, $CH_4$, and $C_7H_{16}$ was fed into the alumina tube 24 through a smaller alumina tube acting as the inlet port 25, which was sealed to the alumina tube 24 with the help of a ceramic paste which is thermally stable up to a temperature of 1500° C.

Table 2: Typical Properties of Delayed Petroleum Coke (Ultimate Analysis as Received, Weight %)

TABLE 2

Typical properties of delayed petroleum coke
(Ultimate Analysis as Received, Weight %)

| | Average | Range |
|---|---|---|
| Constituent | | |
| Carbon | 79.74 | 75.0-86.0 |
| Hydrogen | 3.31 | 3.0-3.6 |
| Nitrogen | 1.61 | 1.3-1.9 |
| Sulfur | 4.47 | 3.4-5.3 |
| Ash | 0.27 | 0.0-0.6 |
| Oxygen | 0.00 | 0.0-0.1 |
| Moisture | 10.60 | 5.5-15.0 |
| HHV, MJ/kg | 31.3 | 29.3-33.7 |
| Ash Properties, ppm | | |
| Vanadium | <2,000 | 500-2,000 |
| Nickel | 336 | 250-450 |
| Iron | 84 | 50-250 |
| Volatile Matter, % | 10 | 8-16 |

The performance of the fuel cell 10 was measured at 800° C., 900° C., and 950° C. using petroleum coke, coke/$CH_4$, coke/$CH_4$/$C_7H_{16}$/, coke/$H_2$/$H_2S$ as fuels.

Results

Figure 8:
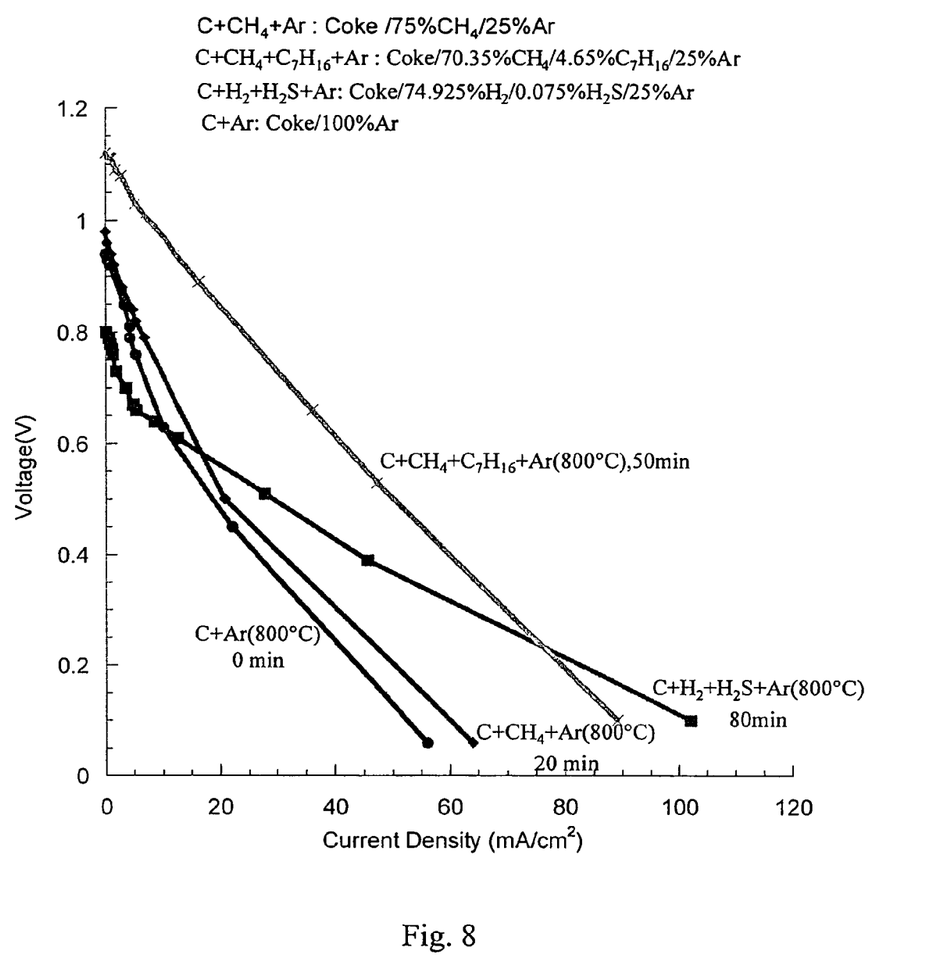
FIG. 8 is a plot comparing voltage versus current density characteristics of a fuel cell operating at a temperature of 800° C. on different fuels.

FIG. 8 shows the voltage v. current density curves (I-V curves) observed at 800° C. The measured current density increased for each fuel in the order: coke<coke/$CH_4$<coke/$H_2$/$H_2S$<coke/$CH_4$/$C_7H_{16}$. The low initial current density with coke as a fuel suggests that the Ni anode catalyst was not completely reduced. Introduction of $CH_4$ and $H_2$ promoted the reduction of the initial NiO to Ni. Increasing fuel temperature from 800° C. to 900° C. caused an increase in the current density for all of the fuels used in this study. Interestingly, $H_2S$ did not lead to a significant deactivation of the anode catalyst.

Figure 9:
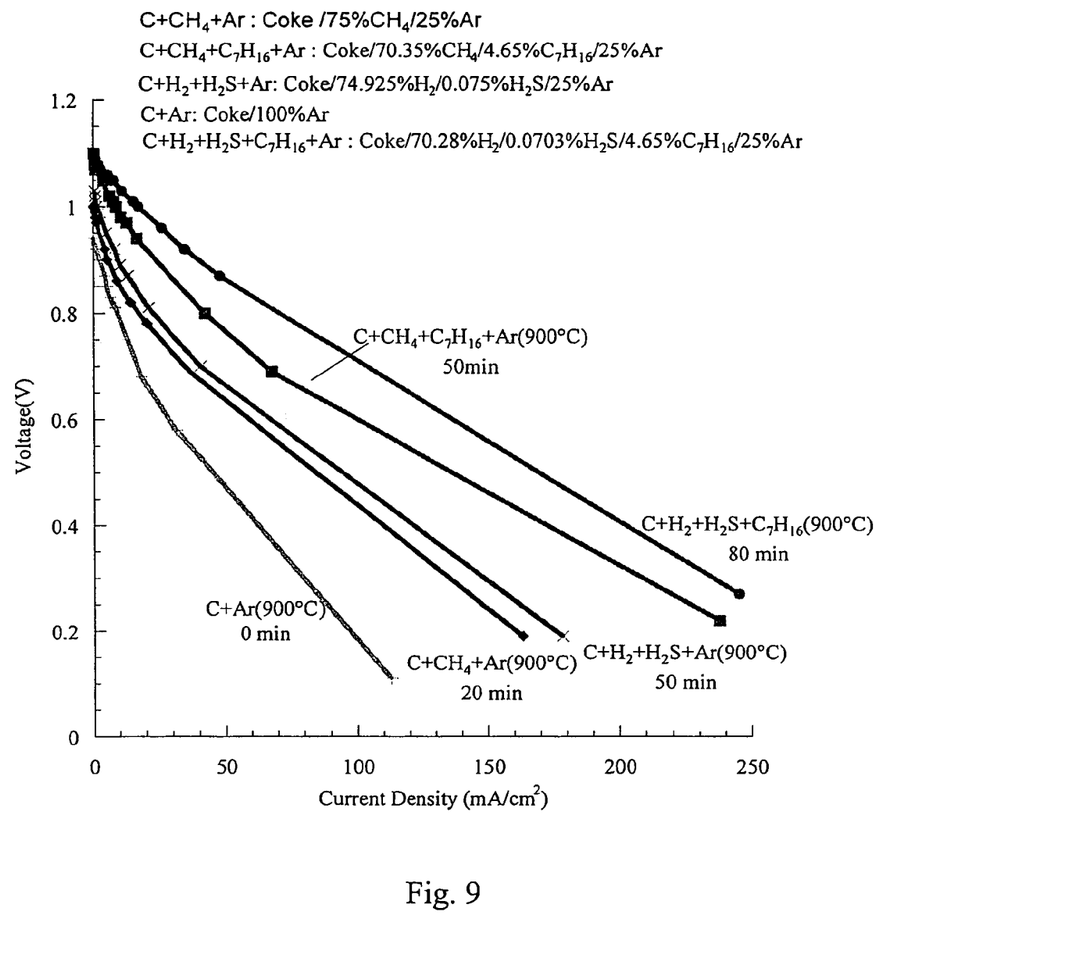
FIG. 9 is a plot comparing voltage versus current density characteristics of a fuel cell operating at a temperature of 900° C. on different fuels.

The most effective fuel at 900° C. was coke/$H_2$/$H_2S$/$C_7H_{16}$, as shown in FIG. 9. The failure of $H_2S$ to significantly poison the anode catalyst was probably due to the presence of Re. It is believed that Re imparts its sulfur resistance to the Ni catalyst in the petroleum refining process.

Figure 10:
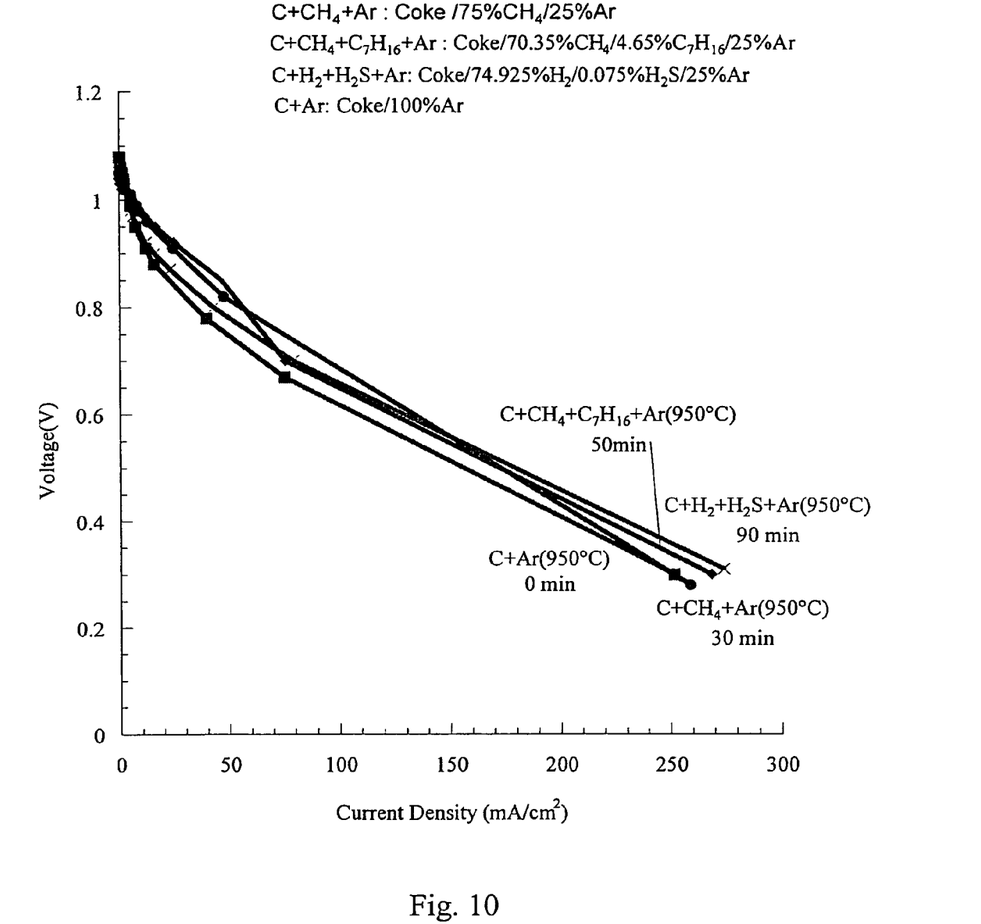
FIG. 10 is a plot comparing voltage versus current density characteristics of a fuel cell operating at a temperature of 950° C. on different fuels.

Increasing operating temperature of the fuel cell to 950° C. led to further increase in the current density, which can be observed in FIG. 10. At 950° C., it was observed that the I-V curves were merged together, and thus, had approximately the same slope. This result suggests that the Ohmic resistance of the solid-oxide electrolyte 18 dominates the resistance to charge flow at this temperature. This is in contrast to those results at 900° C. and 800° C. where the large negative slope was observed for the curves of the coke in the low-current-density region. The large negative slope is believed to be due at least in part to activation polarization of the anode catalyst. Activation polarization is defined as a voltage loss which is directly related to the rate of electrochemical reaction on the electrode. Activation can be improved by the proper selection of the anode/cathode catalysts and control of their structure, operating temperature and pressure, and current density. The results suggest that the anode catalyst is not sufficiently active, and thus, led to a large activation polarization at low temperature.

From the experiment discussed above, it is believed that Re (Rhenium) is a suitable material for imparting sulfur-resistance to the anode catalyst and Ni—Re exhibits the activity for direct electrochemical oxidation of petroleum coke, which has a heating value and cost comparable to those of coal.

From the above description of the invention, those skilled in the art will perceive improvements, changes and modifications. Such improvements, changes and modifications within the skill of the art are intended to be covered by the appended claims.

What is claimed is:

1. A direct-electrochemical-oxidation fuel cell for generating electrical energy from a solid-state organic fuel at an operating temperature of from 600° C. to 1000° C. comprising:
  a cathode provided with an electrochemical-reduction catalyst that promotes formation of oxygen ions from an oxygen-containing source at the cathode;
  a solid state anode provided with an electrochemical-oxidation catalyst that promotes direct electrochemical oxidation of the solid-state organic fuel in the presence of the oxygen ions to produce electrical energy, said solid state anode being solid at the operating temperature; and
  a solid-oxide electrolyte disposed to transmit the oxygen ions from the cathode to the anode;
  wherein electricity is generated by direct electrochemical oxidation at the anode according to the reaction:

2. The fuel cell according to claim 1, wherein formation of the oxygen ions at the cathode proceeds according to the reaction:

3. The fuel cell according to claim 1, wherein the solid-state organic fuel is coal, graphite, biomass or a combination thereof.

4. The fuel cell according to claim 3, wherein the biomass is selected from a group consisting of peat, rice hulls, and corn husks.

5. The fuel cell according to claim 1, wherein the direct electrochemical oxidation at said anode produces a product comprising a $CO_2$ concentration of at least 50 mol %.

6. The fuel cell according to claim 1, wherein the electrochemical reduction catalyst is lanthanum strontium manganese oxide.

7. The fuel cell according to claim 1, wherein the electrochemical-reduction catalyst is selected from $La_{0.8}Sr_{0.2}FeO_3$ (LSF); $LA_{0.6}SR_{0.4}FE_{0.8}CO_{0.2}O_3$ (LSCF); $Sm_{0.5}Sr_{0.5}CoO_3$ (SSC); $YBa_2Cu_3O_y$, wherein y is an integer having values within a range of 7 to 9; $La_{0.99}MnO_3$; $LaMnO_3$; $La_xSr_yMn_3$ and $La_xCa_yMnO_3$, wherein x is a number having values within a range of 0.6 to 0.95, and y is a number having values within a range of 0.1 to 0.4.

8. The fuel cell according to claim 1, wherein the electrochemical-reduction catalyst is selected from a material having a general formula of $A_xB_yCO_3$, wherein A is selected from La, Gd, Sm, Nd, Pr, Tb and Sr, B is selected from Sr, Ce, and Co, x is a number having values within a range of 0.6 to 0.94, and y is a number having values within a range of 0.1 to 0.4.

9. The fuel cell according to claim 1, wherein the electrochemical-oxidation catalyst provided to the anode includes platinum.

10. The fuel cell according to claim 1, wherein the electrochemical-oxidation catalyst includes rhenium.

11. The fuel cell according to claim 10, wherein the electrochemical-electrochemical oxidation catalyst is R3-NiO/YSZ.

12. The fuel cell according to claim 10, wherein the electrochemical-oxidation catalyst is Cu oxide-Pt.

13. The fuel cell according to claim 1, wherein the solid-oxide electrolyte is selected from doped oxides of Bi, Zr, Hf, Th, and Ce with either alkaline earth oxides such as CaO or MgO, or rare-earth oxides selected from $sc_2o_3$, $Y_2O_3$, and $Yb_2O_3$.

14. The fuel cell according to claim 1, wherein the solid-oxide electrolyte is selected from the group consisting of yttrium-stabilized zirconium and bismuth oxide.

15. The fuel cell according to claim 1, further comprising a housing that encloses the anode for receiving the solid-state organic fuel.

16. The fuel cell according to claim 15, further comprising feed passage through which the solid-state organic fuel can be inserted into the housing.

17. The fuel cell according to claim 1, wherein the electrochemical oxidation that occurs at the anode produces a product comprising a $NO_x$ concentration of less than 5 mol %, wherein x is an integer within a range of 1 to 3.

18. The fuel cell according to claim 17, wherein the fuel cell has a maximum operating temperature of about 1200° C.

19. The fuel cell according to claim 1, wherein the direct electrochemical oxidation that occurs at the cathode results in a product comprising a CO concentration that is less than 10 mol %.

20. The fuel cell according to claim 19, wherein the fuel cell has a maximum operating temperature of about 1200°.

21. The fuel cell according to claim 1, wherein the fuel cell produces an electrical current of at least 100 mA/cm² for a period of time lasting at least 48 hours.

22. The fuel cell according to claim 1, wherein the fuel-conversion efficiency of the fuel cell is at least 30 mol % at 950° C.

23. The fuel cell according to claim 1 wherein said anode includes a sulfur-resistant material.

24. The fuel cell according to claim 23, wherein the sulfur-resistant material includes at least one of Re, Mn and Mo.

25. The fuel cell according to claim 24, wherein the sulfur-resistant material is selected from Re—NiO/YSZ and Cu oxide-Pt.

26. The fuel cell according to claim 23, wherein the electrochemical-reduction catalyst is lanthanum strontium manganese oxide.

27. The fuel cell according to claim 23, wherein the electrochemical-reduction catalyst is selected from $La_{0.8}Sr_{0.2}FeO_3$ (LSF); $La_{0.6}Sr_{0.4}Fe_{0.8}Co_{0.2}O_3$ (LSCF); $Sm_{0.5}Sr_{0.5}CoO_3$ (SSC); $YBa_2Cu_3O_y$, wherein y is an integer having values within a range of 7 to 9; $La_{0.99}MnO_3$; $LaMnO_3$; $La_xSr_yMn_3$ and $La_xCa_yMnO_3$, wherein x is a number having values within a range of 0.6 to 0.95, and y is a number having values within a range of 0.1 to 0.4.

28. The fuel cell according to claim 23, wherein the solid-oxide electrolyte is selected from doped oxides of Bi, Zr, Hf, Th, and Ce with either alkaline earth oxides such as CaO or MgO, or rare-earth oxides selected from $sc_2$, $o_3$, $Y_2O_3$, and $Yb_2O_3$.

29. The fuel cell according to claim 28, wherein the solid-oxide electrolyte is selected from the group consisting of yttrium-stabilized zirconium and bismuth oxide.

30. The fuel cell according to claim 23, wherein electrochemical oxidation of the solid-state organic fuel at the anode produces a product having a $CO_2$ concentration of at least 50 mol %.

31. The fuel cell according to claim 30, wherein the fuel cell has a maximum operating temperature that is less than 1200° C.

32. The fuel cell according to claim 23, wherein electrochemical oxidation of the solid-state organic fuel at the anode produces a product having a $NO_x$ concentration that is less than 0.1 mol %, wherein x represents integers ranging from 1 to 3.

33. The fuel cell according to claim 23, wherein the electrochemical-oxidation catalyst is selected from a noble metal, group VIII metal/metal oxide, oxides of sulfur-resistant materials, oxides of Ce, Cr, Fe, and Pb, combinations thereof, multiple oxides, Cu oxide-Pt, and Re—NiO/YSZ, wherein the electrochemical-oxidation catalysts including non-noble metals also include a sulfur-resistant substance selected from Re, Mn, Mo, Ag, Cu, and Au.

34. The fuel cell according to claim 13, wherein the solid oxide electrolyte comprises at least one of $Bi_2O_2$, $(Bi_2O_7)_{0.75}(Y_2O_3)_{0.25}$, $BaTh_{0.9}Gd_{0.1}O_3$, $La_{0.8}Sr_{0.2}Ga_{0.8}Mg_{0.2}O_3$, $(Ce_2)_{0.8}(GdO_{0.5})_{0.2}$, $(ZrO_2)_{0.9}(Sc_2O_3)_{0.1}$, $(ZrO_2)_{0.9}(Y_2O_3)_{0.1}$, $(ZrO_2)_{0.87}(CaO)_{0.13}$, $(La_2O_3)_{0.95}(SrO)_{0.05}$.

35. The fuel cell according to claim 28, wherein the solid oxide electrolyte comprises at least one of $Bi_2O_2$, $(Bi_2O_7)_{0.75}(Y_2O_3)_{0.25}$, $BaTh_{0.9}Gd_{0.1}O_3$, $La_{0.8}Sr_{0.2}Ga_{0.8}Mg_{0.2}O_3$, $(Ce_2)_{0.8}(GdO_{0.5})_{0.2}$, $(ZrO_2)_{0.9}$ $(SC_2O_3)_{0.1}$ $(ZrO_2)_{0.9}(Y_2O_3)_{0.1}$, $(ZrO_2)_{0.87}(CaO)_{0.13}$, $(La_2O_3)_{0.95}(SrO)_{0.05}$.

* * * * *